No. 888,904. PATENTED MAY 26, 1908.
H. D. JAMES.
SYSTEM OF ELECTRIC MOTOR CONTROL.
APPLICATION FILED MAR. 3, 1906.
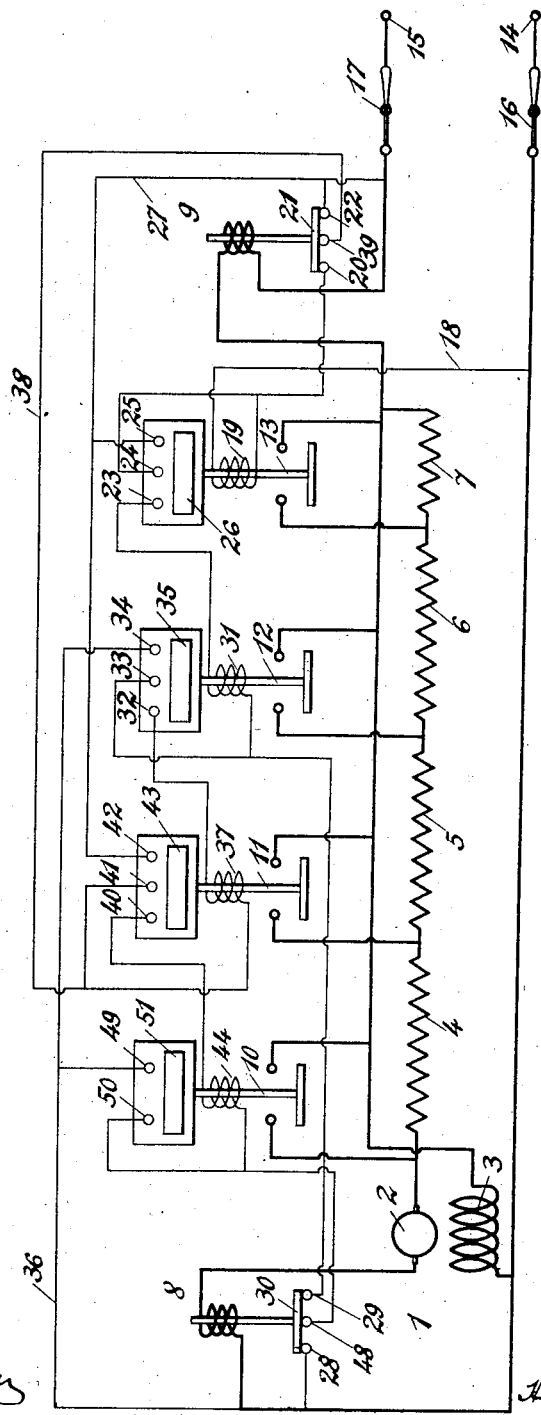
WITNESSES:
Camille Boulin
R. J. Dearborn.
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-MOTOR CONTROL.

No. 888,904.          Specification of Letters Patent.          Patented May 26, 1908.

Application filed March 3, 1906. Serial No. 304,119.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Electric-Motor Control, of which the following is a specification.

My invention relates to systems of control for electric motors and it has for its object to provide, in a system which comprises a plurality of switches that are adapted to be operated in a predetermined sequence, a single operating magnet coil for each switch, means for subjecting the operation of said switches to limitations imposed by devices which are dependent for their action upon the current flowing in the motor circuit and means for so controlling the operating coils, without interrupting their circuits, that they shall serve as retaining coils to hold the switches in their closed positions.

Control systems for electric motors which provide automatic acceleration and comprise interlocking switches for effecting the closure of the accelerating switches in a predetermined order, are preferably provided with limiting devices which delay the operation of the several switches and are dependent upon the value of the current flowing in the motor circuit. In order to prevent the switches from opening after they have been closed without the use of two similar magnet coils, one for closing the switch and the other for retaining it in its closed position, it has been usual to provide means for transferring each coil from an operating circuit, which may be interrupted by the limiting devices, to an independent circuit, as the switch is closed. This arrangement, however, is restricted in its use to relatively low voltage circuits and involves several contact terminals for each accelerating switch. In order to avoid the restrictions of the prior art I provide a pair of similar limiting devices which severally control alternate accelerating switches.

The single figure of the accompanying drawing is a diagrammatic view of a control system embodying my invention.

Referring to the drawing, the system illustrated, comprises an electric motor 1, having an armature 2 and a field magnet winding 3, a plurality of resistance sections 4, 5, 6 and 7, a pair of similar limiting devices 8 and 9 and a series of accelerating switches 10, 11, 12 and 13. The system may be supplied with energy from a supply circuit 14—15 in which manually-operated cutout switches 16 and 17 are located. Energy is first supplied from line conductor 14 through switch 16, the actuating coil of the limiting device 8, armature 2 of the motor 1, resistance sections 4, 5, 6 and 7, operating coil of limiting device 9 and switch 17 to the opposite line conductor 15. Thus the motor 1 is first connected across the line with resistance sections 4, 5, 6 and 7 in series therewith. Energy is also supplied from line conductor 14 through switch 16, conductor 18, operating magnet coil 19 of the switch 13, contact terminal 20, bridging contact member 21, and contact terminal 22 of the limiting device 9 and the switch 17 to the opposite line conductor 15. The energizing of the coil 19 closes the switch 13 which short-circuits the resistance section 7 and interconnects contact terminals 23, 24 and 25 by moving a bridging contact member 26 into engagement therewith.

It will be observed that the energizing of the coil 19 is dependent upon the closing of the limiting device 9 so that the switch 13 may not be closed until the current flowing in the motor circuit falls below a predetermined value. As soon as the switch 13 is closed, circuit is completed from conductor 18 through coil 19, contact terminals 24 and 25, which are bridged by the contact member 26, and conductor 27 to the opposite line conductor 15. Circuit is now completed through the coil 19 regardless of the position occupied by the limiting device 9, the two circuits being in multiple so that circuit through the coil 19 is not interrupted as the change takes place.

As soon as the resistance section 7 is short-circuited the motor current will necessarily be materially increased and the limiting devices 8 and 9 will probably be opened. As soon as these devices again close and the motor speed increases, circuit is completed from the conductor 14 through switch 16, contact terminals 28 and 29, which are connected by the bridging contact member 30 of the limiting device 8, magnet coil 31 of the switch 12, contact terminals 23 and 25 of the switch 13, which are now bridged by the contact member 26, and conductor 27 to the opposite line conductor 15. As soon as the switch 12 is closed, resistance sections 6 and 7 are short-circuited and contact terminals 32, 33 and 34 are interconnected by a bridging contact member 35 so that circuit is now continued through conductor 36, contact terminals 34 and 33 to the operating coils 31 of the switch 12, from which point circuit is completed as hereinbefore described. Circuit is also completed, as soon as the switch 12 is closed, from conductor 36 through contact terminals 34 and 32, operating coil 37 of the switch 11 and conductor 38 and contact terminals 39 and 22 of the limiting device 9 to the opposite line conductor 15. The closing of the switch 11 is therefore dependent upon the closing of the limiting device 9 and, when closed, the switch serves to short-circuit the resistance sections 5, 6 and 7 and also to interconnect contact terminals 40, 41 and 42, by means of a bridging contact member 43. As soon as the switch is closed, however, the operating coil 37 is included in a circuit which is independent of the limiting device and is completed from conductor 36 through contact terminals 34 and 32 of the switch 12, operating coil 37, contact terminals 41 and 42 of the switch 11 and conductor 27 to the opposite line conductor 15.

When the switch 11 is closed, an operating coil 44 of the switch 10 may be energized, provided the limiting device 8 is closed, circuit being completed through contact terminals 28 and 45 of the limiting device, operating coil 44, and contact terminals 40 and 42 of the switch 11 to the opposite line conductor 15. The closing of the switch 10 short-circuits the resistance sections 4, 5, 6 and 7 and the switches are retained in this position, since the coil 44 is now energized from conductor 36, circuit being completed through contact terminals 49 and 50 which are bridged by a contact member 51, coil 44, contact terminals 40 and 42 and conductor 27 to the opposite line conductor 15. As described, the closing of the switches 11 and 13 is dependent upon the limiting device 9 while the closing of the switches 10 and 12 is dependent upon the limiting device 8, each coil being supplied with energy from a circuit which is independent of either limiting device as soon as its switch is closed and without at any time interrupting the supply of energy to the coils during the accelerating process.

I claim as my invention:

1. In a control system, the combination with a source of electric energy, a motor, and means for automatically effecting the acceleration of the motor, of a pair of switching devices which are adapted to act alternately in delaying the acceleration of the motor.

2. In a control system, the combination with a source of electric energy, a motor, and a plurality of independently operated accelerating switches therefor, of a pair of switching devices which are adapted to act alternately in delaying the successive operation of the accelerating switches.

3. In a control system, the combination with a source of electric energy, a motor, and a plurality of independently operated accelerating switches therefor, of a pair of switching devices which are dependent upon the current traversing the motor circuit and are adapted to act alternately in delaying the successive operation of the accelerating switches.

4. The combination with an electric motor, a supply circuit therefor, a resistance in circuit therewith, switches that are adapted to short-circuit said resistance, and operating magnet coils for said switches, of a pair of similar limiting devices which are dependent upon the current traversing the motor circuit and act alternately in delaying the action of the short-circuiting switches.

5. The combination with an electric motor, a supply circuit therefor, a plurality of accelerating switches therefor, operating magnet coils for said switches, and a pair of similar limiting devices which alternately control the closing of the successive switches, of means for shunting the limiting devices to prevent re-opening of the circuit upon a subsequent action of the limiting devices as each accelerating switch is closed.

6. The combination with an electric motor, and suitable resistance in circuit therewith, accelerating switches that are adapted to short-circuit portions of said resistance in a predetermined sequence, and operating magnet coils for said switches, of a pair of limiting devices that are alternately connected in circuit with the successive operating coils of the several switches, and means for supplying energy to the operating coil of each switch through a circuit which parallels the limiting devices as each switch is closed.

7. The combination with an electric motor, and suitable resistance in series circuit therewith, short-circuiting switches therefor which are adapted to close in a predetermined sequence, and operating magnet coils for said switches, of a pair of limiting devices that are energized from the motor circuit, and limiting devices being adapted to act alternately in delaying the successive closure of the short-circuiting switches.

In testimony whereof, I have hereunto subscribed my name this 27th day of February, 1906.

HENRY D. JAMES.

Witnesses:
 EDWIN E. LEHR
 BIRNEY HINES.